June 17, 1941.   C. KILICH   2,246,211
METHOD OF AND MEANS FOR MIXING AND ATOMIZING LIQUIDS
Filed Jan. 24, 1938   2 Sheets-Sheet 1
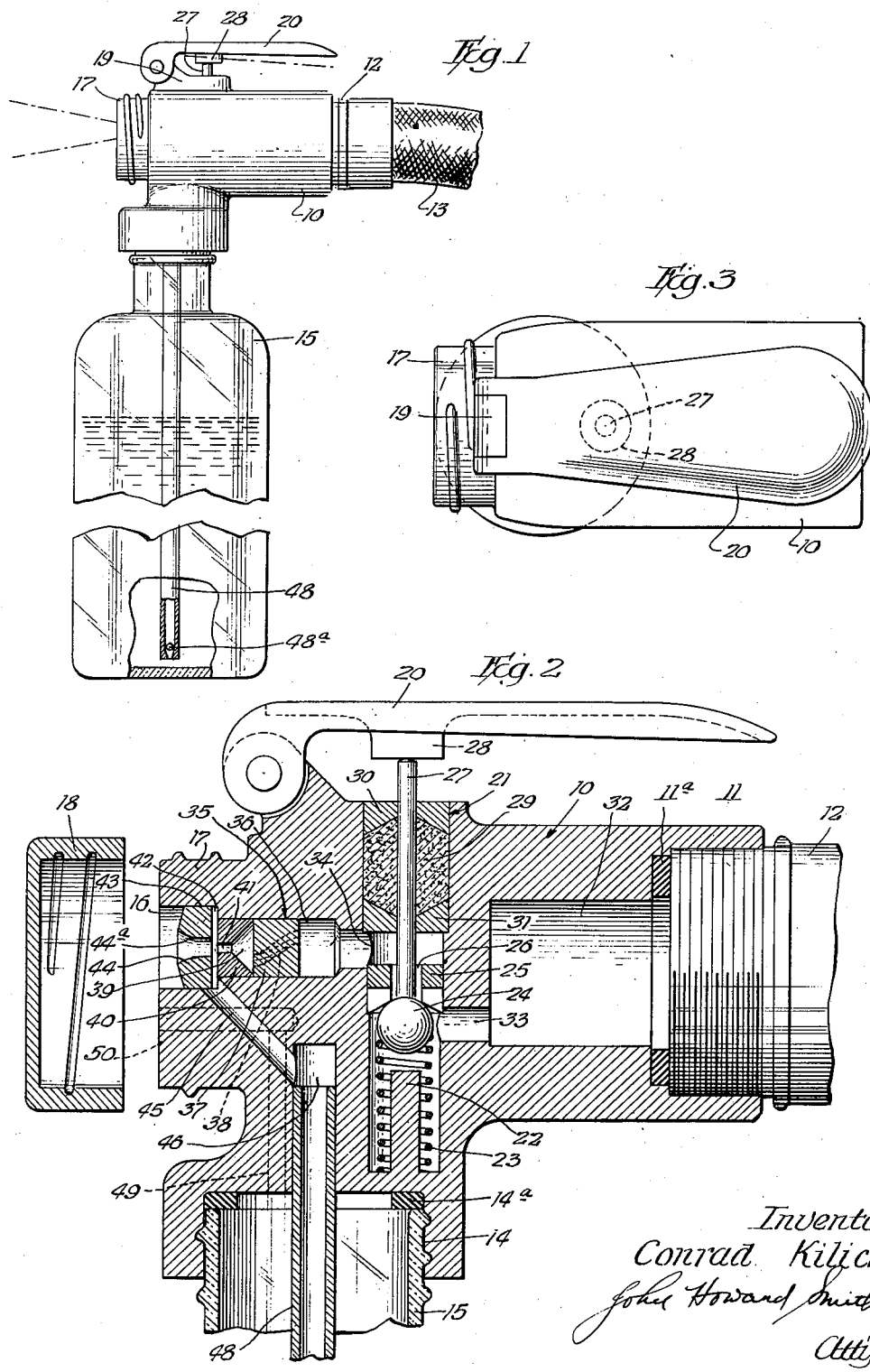
Inventor
Conrad Kilich
John Howard Smith
Atty.

June 17, 1941. C. KILICH 2,246,211
METHOD OF AND MEANS FOR MIXING AND ATOMIZING LIQUIDS
Filed Jan. 24, 1938 2 Sheets-Sheet 2
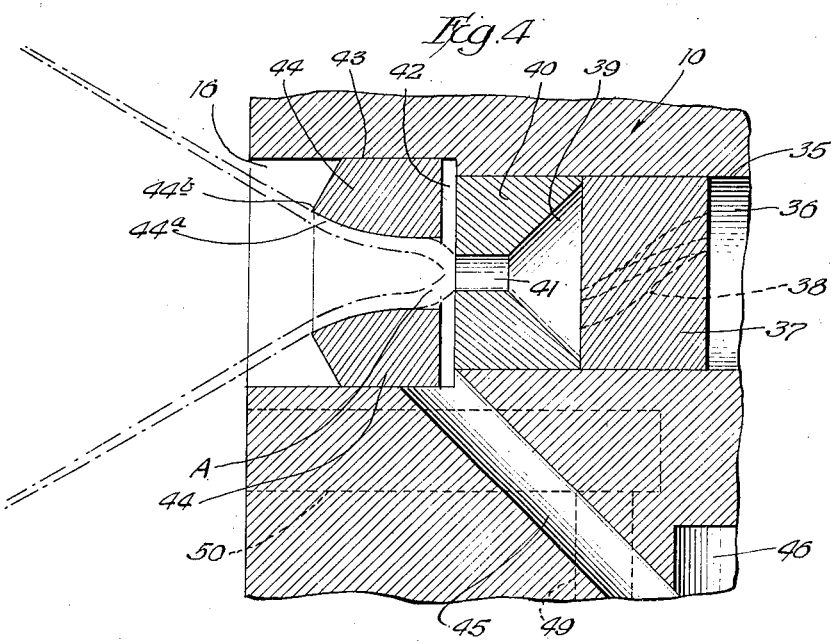
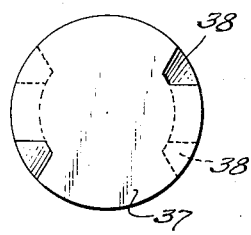
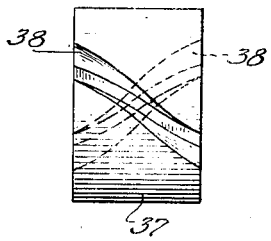
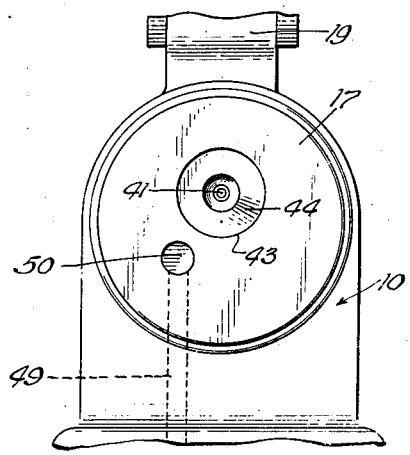
Inventor
Conrad Kilich Patented June 17, 1941

2,246,211

UNITED STATES PATENT OFFICE 2,246,211

METHOD OF AND MEANS FOR MIXING AND ATOMIZING LIQUIDS

Conrad Kilich, Milwaukee, Wis.

Application January 24, 1938, Serial No. 186,573

9 Claims. (Cl. 299—140)

This invention relates to a mixing and atomizing attachment of the type utilizing the flow of a liquid therethrough to pick up a material for mixing therewith. More particularly the invention relates to an improved device of the above character which is adapted for use with the ordinary garden hose and at the pressures found therein, and which is well adapted to apply insecticides, fungicides and the like to plants and the foliage of trees in an improved manner.

In mixing devices of the type here involved it is generally found that the resulting mixture of materials is not homogeneous. To obviate this decided disadvantage and as one of the objects of the invention, there is provided herein an improved construction for conditioning the liquid so that when the material to be picked up merges therewith it will do so to form a homogeneous mixture or solution. This is accomplished herein by providing a swirl momentum and by providing a rough surface on the body of liquid at the point where the insecticidal ingredient merges therewith.

Another object of the invention is to provide an improved construction wherein the mixture formed is finally atomized and emitted as a well dispersed body, this being accomplished herein by additionally atomizing the mixture before it is dispensed into the atmosphere.

Another object of the invention is to provide an improved construction which imparts to the device an improved mixing action, with the result that a small volume of the active ingredients may be mixed with the reduced flow of a hose stream and yet a homogeneous, atomized final product is obtained. The use of a smaller volume of well mixed solution is highly advantageous in that when too great a volume of material is discharged onto the plants or foliage it is inclined to wash off or fall to the ground, thus being of no benefit to the plant life.

Still another object of the invention is to increase the throw of material by reducing the swirl momentum before the mixture is dispensed into the atmosphere.

More specifically it is an object of the invention to provide an attachment of the class described with a liquid conducting duct, which duct has, in the following order in the direction of flow of the liquid through the duct, a deflector for imparting a swirling motion to liquid passing through the duct; a swirl chamber following the deflector; a restriction in the duct following the swirl chamber; an expansion chamber following the restriction; an outlet of a material conducting passage in the expansion chamber, said passage having a ball valve operated inlet adapted for immersion in a body of an active ingredient; an impact atomizer following the expansion chamber; and an outwardly flared mixture outlet.

Still another object of the invention is to provide an attachment of the class described with a material container, and to provide an air passage to the container through the attachment, this air passage having an inlet port in the vicinity of the mixture outlet port so that both ports may be covered by a single cap to prevent the contents of the container from spilling through either passage.

Other objects and advantages of the invention will be apparent from the following description and accompanying drawings, in which:

Fig. 1 is a side elevation of the attachment;

Fig. 2 is a longitudinal cross section of the attachment;

Fig. 3 is a top plan view of the attachment;

Fig. 4 is an enlarged, cross sectional view of the mixing and atomizing mechanism in the liquid duct;

Fig. 5 is an end view of the deflecting element;

Fig. 6 is a side elevation of the deflecting element; and

Fig. 7 is a fragmentary front view of the device showing the atomizing jet.

It is to be understood that the embodiment disclosed herein is for illustrative purposes only and may be modified without departing from the spirit and scope of the appended claims.

Referring to Fig. 2, the attachment comprises generally a casing 10 having an internally threaded horizontally extending inlet 11 fitted with a sealing gasket 11a, and shown herein as receiving the outlet connection 12 of a garden hose 13. In its lower part, the attachment has an internally threaded, vertically extending container receiving recess 14 fitted with a sealing gasket 14a, and adapted to receive the neck of a suitable container 15 for insecticides or the like. At the forward end of the casing 10 there is a horizontally directed mixture outlet 16 and on this side the casing is formed to provide an externally threaded extending portion 17 adapted to receive a suitable cap 18. A lug 19 is formed on the upper forward portion of the casing and a suitable valve operating handle 20 is pivoted to this lug and extends rearwardly along the device to be operated in a manner presently to be described. The attachment has drilled in its upper side a cylindrical cavity 21 having a vertical axis, this cavity being adapted to receive portions of a valve control mechanism.

This valve cavity 21 is so formed that there extends vertically upwardly from its lower surface a pin 22 adapted to align a compression spring 23 upon the upper end of which a ball valve 24 is seated. A cylinder-like valve seating member 25 is secured by a press fit coaxially in the cavity 21 and is centrally bored as at 26, the ball 24 being normally pressed by the spring 23 against the lower face of the member 25 to close the passage provided by the bore 26.

A push rod 27 extends downwardly through the bore 26 and bears downwardly against the upper surface of the ball 24, the upper end of the rod being normally pressed by the spring and ball combination against an abutment lug 28 depending from the lower surface of the handle 20. The rod 27 is maintained in central alignment in the cavity 21 by means of the usual wad of packing 29 which is in turn held in place by opposed, centrally apertured plugs 30 and 31. Thus under the influence of the spring 23 and ball valve normally closes the passage formed by the bore 26 and under the influence of downward movement of handle 20 and rod 27 against the spring, the valve is displaced downwardly to permit the flow of liquid through said passage.

Liquid from the hose 13 is admitted into a chamber 32 at the rear of the casing and passes from this chamber through a duct 33 into that portion of cavity 21 below the member 25. The mixture outlet 16 communicates with that portion of the cavity 21 which is above the member 25 and below the packing plug 31 through a duct 34 which serves as the inlet to the duct designated generally as 35.

It is primarily the passage of material through this duct 35 which accomplishes the objects set out above. Assuming that the handle 20 is depressed to move the plunger rod 27 and ball valve 24 downwardly against the upward pressure of the spring 23 to open the bore 26, the liquid flows, under the influence of normal pressure in the hose 13, into chamber 32, through duct 33, upwardly in the cavity 21, through bore 26 and thence through the passage 34 and discharges from passage 34 into a portion 36 of the duct 35. As it progresses along duct 35 the liquid encounters a deflector 37 which is cylindrical in shape and has helical grooves 38 cut in the side thereof, which grooves, with the wall of duct 35, form spiral passages through which the liquid passes to assume a swirling motion when emitted into the swirl chamber 39 following the deflector 38.

The chamber 39 is formed by a portion of the walls of the duct 35, the forward face of the deflector 38 and a conically drilled recess in the rear face of a jet 40 inserted by a press fit in the duct. This jet 40 has a central longitudinal passage 41 drilled therein and has its inlet at the apex of the conical recess. Thus it will be seen that the liquid, as it is pressure fed through the conical chamber, will be directed gradually to the inlet end of passage 41 and in being so directed will not encounter any abrupt shoulders or other obstructions thereby to lose its swirling motion.

The liquid is discharged from the passage 41 into an expansion chamber 42 formed by the walls of an enlarged portion 43 of the duct 35, the front face of the jet 40 and the rear face of an atomizing jet 44 having a forwardly flared passage 44a disposed concentrically with the passage 41 and being of larger inlet diameter than the outlet diameter of the latter.

By reference to Fig. 4, where the liquid is represented schematically at A, it will be seen that the discharge from the passage 41 is somewhat cone shaped, as is usually the case with a swirl discharge, and that the liquid is discharged from the outlet of 41 through the expansion chamber and into the relatively larger inlet of the passage 44a. This discharge of liquid begins to expand immediately upon leaving the passage 41. It will also be seen that the size of this inlet of passage 44a and its distance from the discharge outlet of passage 41 is such that the sides of the cone impinge against the wall of passage 44a at a point intermediate the inlet and the outlet thereof, and that this impingement is at an acute angle and the forward flow of liquid creates a vacuum in the annular unoccupied space at the periphery of the inlet of passage 44a and in the expansion chamber 42.

Communicating with the lower portion of the expansion chamber is an obliquely disposed fluid inlet duct 45 which is connected at its lower end to a vertical duct 46 comprising a bore 47 having a vertical inlet tube 48 secured therein by a press fit. The tube 48 extends downwardly into the container 15 and has its lower enlet end submerged in a solution carried in the container. Back flow of the active ingredient into the container 15 is prevented by the ball valve 48a which is held in, and operates at the foot of the tube 48 by virtue of the restricted inlet thereof. By so preventing the back flow it will be understood that after an initial functioning period, the tube 48 and duct 45 will become filled and then need not be again filled by the vacuum created, at every successive operation of the handle 20. Thus after this initial operation, the user need not repeatedly wait for the active ingredient to be drawn from the liquid level in the container but a mixture containing the proper proportion of the active ingredient will be discharged from the attachment immediately upon downward movement of the handle 20.

If it is desired to clean the ducts of the attachment it is merely necessary to secure the cap 18 in place, turn the attachment upside down to prevent the valve 48a from closing the inlet of the tube 48, and open the bore 26 to permit water from the hose to pass into the duct 35. Under these conditions the water will pass in a reverse direction from duct 35, through duct 45 and out of the inlet end of tube 48.

As previously stated, the liquid discharged from the passage 41 (into the expansion chamber 42) immediately expands and has retained its swirling momentum. This has a dual effect. First, it creates a degree of dispersion in the discharged liquid whereby the outer surface of the cone becomes rough and is better adapted to pick up the insecticidal or fungicidal fluid which is drawn upwardly from the container under the influence of the previously explained vacuum, which is augmented by the angular impingement of the cone against the walls of the passage 44a. Second, due to the swirling motion the cone picks up the fluid around its entire circumference to create a more homogeneous mixture. With such a construction and under such operation the possibility of a final discharge in which the upper portion is dilute or has no insecticidal value whatsoever and in which the lower portion contains an excessive amount of insecticidal material, is obviated.

A further advantage in flaring the passage 44a is that the final discharge of mixture is in the form of a relatively widely broadcast mass rather than in a localized stream, with the result that a large area of plants is covered by this discharge.

Another aspect of the invention is the increase of throw of atomized liquid after it has left the outlet 16, and this is also accomplished herein by the presence of the jet 44. It will be readily understood that the distance through which the emitted particles travel after leaving the outlet 16 will be greatly reduced by a continued longitudinally angular momentum, as compared to a discharge path which is longitudinal to the general flow of liquid through the attachment. After impinging against the wall of passage 44a the mixture continues to flow along this wall at the outwardly flaring portion until it reaches the edge 44b, at which point it leaves the jet and is discharged into the atmosphere as a cone. The effect of this relatively prolonged passage of the mixture along the wall of the passage 44a is to considerably reduce the swirl momentum which has been imparted to the liquid by the deflector 37. Thus when discharged the particles assume a more straight-line path than would be the case in the absence of the passage 44a. By increasing the pick-up action of the carrier liquid by creating an expanded rough surface and by providing a construction wherein the throw of the final mixture is increased, it will be seen that the necessity of a large, fast flowing volume of carrier liquid is herein eliminated. It has been found that the amount of liquid necessary to operate the device may be reduced to about 1 to 3% of the amount passing through the average garden hose during normal operation. This results in the elimination of the previously mentioned washing away of the active ingredient and also effects a great economy in the amount of active ingredient used per area of foliage treated.

Another important function of the impingement of the mixture against the wall of passage 44*a* and the progression of the mixture along said wall to the edge 44*b* thereof, is that the final atomization of the mixture is thereby brought about. In the past it has been the practice to discharge the material into the atmosphere directly after the mixing operation. However, it is found that a degree of the atomization occurring by the discharge from the passage 41 is lost during the merging of the liquid in the duct 35 and the liquid from the conduit 45. With the present construction this atomization which has been forfeited during the mixing operation is restored to the final mixture so that a fine spray rather than coarse particles is discharged into the atmosphere. Two factors contribute to this final atomization, first, the impact of the mixture with the wall of the passage, and second, the outward flare of the passage which tends to form a cone-like body of increasing diameter, under which circumstances a further breakdown of the mixture particles occurs.

It will be seen that entire control of the device may be had by manipulation of the handle 20 which controls the flow of actuating or carrier liquid from the hose line.

I also contemplate the use of my device as an atomizing attachment. In such event the container receiving portion 14 of the casing, the expansion chamber 42, ducts 49 and 50, duct 45, and tube 48 will be dispensed with and the material being sprayed, such as paint, lacquer or the like, will be discharged in a manner characteristic to that above described.

It will be readily understood that as material is withdrawn from the container it must be replaced by air to permit continued withdrawal. The problem which arises with the provision of an air inlet in the system is that escape of the material through the inlet is likely to occur when the device is handled when not in use.

With the present embodiment such a condition cannot occur, since the air inlet is so constructed that it is covered by the usual cap attached to protect the atomizing outlet.

In the present embodiment the air inlet for the container 15 is shown as comprising a vertical duct 49 drilled into the casing 10 and having its lower end communicating with the container recess 14 of the casing. A horizontally disposed duct 50 has its rear end connected with the duct 49, while its forward or inlet end communicates with the atmosphere through the forward face of the extension 17 of the casing 10. With such a construction the attachment of cap 18 over the extension 17 effectively prevents spilling of liquid through the air inlet or mixture outlet.

What I claim is:

1. In a mixing atomizing device attachable to a garden hose, a casing, said casing having a hose attachment inlet at its rear end and a mixture outlet at its forward end, a duct providing for the passage of liquid from said inlet to said outlet, a valve in said duct for controlling the passage of liquid through said duct, an insecticide conduit in said casing, said conduit having an inlet adapted for submersion in an insecticide reservoir and an outlet in said duct, a deflector positioned in said duct rearwardly of said conduit inlet, said deflector providing a helical path for the flow of liquid toward the duct outlet, a jet positioned forwardly of said deflector, said jet having a rearwardly flared substantially conical recess and a restricted passage parallel to and centrally aligned in said duct at the apex of the conical recess, a second jet in said duct, said jet being positioned forwardly of said first jet and being spaced therefrom, the space between said jets being aligned with the outlet of said conduit to receive insecticide therefrom and providing an expansion chamber for receiving liquid emitted as a relatively thin swirling stream from the first jet, said second jet having a passage therethrough, the inlet of said passage being larger in diameter and on the same center as the outlet of the passage in said first named jet, and being flared toward its outlet end, the liquid from said first named jet being adapted to be emitted into said expansion chamber, to expand and disperse therein to acquire a rough, revolving outer surface and to pass into the inlet of said second jet to strike the wall of the passage therein at an angle to be further atomized by the impact with said wall before emission into the atmosphere.

2. In a mixing atomizing device of the type adapted for attachment to a garden hose at its rear end and having a fluid reservoir secured thereto and communicating therewith, a liquid duct adapted to conduct liquid through said device and having an expansion chamber therein, and a fluid conduit in said device, said conduit having an inlet in the reservoir and an outlet in said duct communicating with said expansion chamber; in combination, means located in said duct rearwardly of said chamber for emitting a swirling, rough surfaced body or stream of liquid thereinto, said means including a deflector in said duct, said deflector being adapted to provide a helical path for liquid passing through the duct toward said expansion chamber, a rearwardly flared conical swirl chamber located forwardly of said deflector and a jet having a restricted passage, said passage being on a center with said swirl chamber at the apex thereof and having its outlet communicating with said expansion chamber, and means for creating a vacuum in said expansion chamber to withdraw fluid from said conduit for mixture with said liquid, for additionally atomizing the mixture emitted from said chamber, said means comprising a second jet located forwardly of said expansion chamber, said second named jet having a passage disposed parallel and concentrically to said duct, said passage having an inlet of larger diameter than the outlet of the passage in said first jet and being flared outwardly forwardly, the mixture emitted from the expansion chamber being adapted to impinge upon the wall of said passage at an angle thereto and at a point removed forwardly of the inlet thereof and to travel substantially longitudinally along said wall to the outlet of said passage.

3. In a mixing atomizing attachment for use on a garden hose having a liquid inlet and a mixture outlet, a duct providing for the passage of liquid from said inlet to said outlet, a conduit for conducting fluid into said duct under vacuum in said duct and an expansion chamber in said duct for receiving said fluid; in combination in said duct, a helical deflector, a swirl chamber for receiving liquid from said deflector, said swirl chamber having a restricted outlet and being progressively, concentrically, of less diameter toward the outlet, and an atomizing jet located forwardly of said swirl chamber outlet, said jet having a passage of larger inlet diameter than the said swirl chamber outlet, said passage being flared toward its outlet and being disposed concentrically with said swirl chamber outlet, said jet being spaced from said outlet so that liquid emitted from said outlet strikes the passage wall at an angle and at a point intermediate the inlet and outlet of said passage, the space in said duct between the swirl chamber outlet and the jet passage inlet constituting the expansion chamber.

4. In an atomizing attachment having a fluid inlet and a fluid outlet and a duct providing for the passage of fluid from the inlet to the outlet, in combination, in said duct, a helical deflector, a swirl chamber for receiving liquid from the deflector, said swirl chamber having a restricted outlet and being progressively, concentrically of less diameter toward the outlet and an atomizing jet located forwardly of said swirl chamber outlet, said jet having a passage therethrough, said passage being flared toward its outlet and being disposed concentrically toward said swirl chamber outlet.

5. In the liquid duct of a device of the class utilizing aspiration as the actuating force for mixing liquids, in combination, means for imparting a swirl to liquid passing through said duct, a restricted passage for receiving the liquid as it progresses forwardly from said means in said duct, an expansion chamber for receiving the liquid as it is discharged with swirling momentum from said restricted passage, a liquid feed conduit leading into said expansion chamber at the edge thereof, and jet means located forwardly of said expansion chamber, said jet means affording a mixture passage of larger inlet diameter than that of the outlet of said restricted passage, being disposed concentrically thereof and being flared toward its outlet end, said expansion chamber being of such width that the outlet of said restricted passage is so spaced relative to the inlet of said last named passage that liquid discharged from said restricted passage enters said last named passage after passing across said expansion chamber and impinges angularly against the wall of said passage at a point thereon between the inlet and the outlet of said passage.

6. In a mixing atomizing device having a liquid duct extending longitudinally thereof, and a fluid feed conduit having an outlet at a longitudinally intermediate point of the wall of said duct; in combination in said duct, a restricted discharge port disposed centrally of the cross section of said duct, a deflector of helical form on the upstream side of said restricted discharge port, a forwardly flared discharge passage on the downstream side of said discharge port, said passage being disposed concentrically with said discharge port and having an inlet adapted to directly receive the entire volume of liquid discharged by said discharge port, said discharge port and the inlet of said passage being so spaced that liquid discharging from said port will enter said passage and impinge against the walls thereof at a point downstream of the inlet of said passage, said port with said passage being so located, when so spaced, longitudinally in said duct that the space therebetween will be substantially coextensive with the outlet of said feed conduit in the wall of said duct.

7. In a device of the class described, an inlet orifice and an outlet orifice, a duct for conveying liquid under pressure from the inlet to the outlet, a cap receiving portion on said device, said outlet being disposed in said cap receiving portion, a liquid conduit having an outlet communicating with said duct, means on said device for receiving the open end of a liquid container, the inlet of said liquid conduit being disposed in said container when the latter is secured to the device, an air passage in said device, said passage having an inlet communicating with the atmosphere through the cap receiving portion and an outlet disposed in a portion of said device exposed to the interior of a container when the latter is secured to said device, a valve disposed in said duct on the inlet side of said liquid conduit outlet, said valve being adapted to normally close said duct against the flow of fuel therethrough.

8. In a portable liquid mixing device of the type utilizing suction to withdraw one liquid into a stream of another liquid, a cap receiving portion, a mixture discharge orifice disposed in the face of said portion, a container securing portion adapted to receive the open end of a container in sealed relationship, a liquid conduit in said device, said conduit having an inlet adapted to communicate with the interior of said container when secured to said device and an outlet adapted to discharge liquid into the stream of the other liquid and an air passage, said passage having an outlet adapted to communicate with the interior of said container when secured to said device and an inlet communicating with the atmosphere, said inlet being disposed adjacent said mixture outlet in the face of said cap receiving portion.

9. A method of mixing and atomizing liquids to increase the throw and homogeneity of the atomized mixture which comprises the steps of impelling a liquid forwardly in a stream, imparting a swirl to the liquid, discharging and expanding said swirling liquid, mixing flowing material with said liquid as it expands and before the swirl momentum has diminished, and reducing the swirl momentum of the mixture prior to the discharge thereof.

CONRAD KILICH.